United States Patent
Ross

[11] Patent Number: 6,017,058
[45] Date of Patent: Jan. 25, 2000

[54] AIRBAG WITH TEAR SEAM AND VENTING

[75] Inventor: Hubert Ross, Oberursel, Germany

[73] Assignee: Breed Automotive Technology, Inc., Lakeland, Fla.

[21] Appl. No.: 09/152,435

[22] Filed: Sep. 14, 1998

[30] Foreign Application Priority Data

Feb. 12, 1998 [DE] Germany .................. 298 02 436 U

[51] Int. Cl.[7] .................................................. B60R 21/16
[52] U.S. Cl. ............................................................ 280/743.1
[58] Field of Search ............................. 280/743.1, 739, 280/730.2

[56] References Cited

U.S. PATENT DOCUMENTS

| | | | |
|---|---|---|---|
| 4,097,065 | 6/1978 | Okada et al. | 280/743.1 |
| 5,219,179 | 6/1993 | Eyrainer et al. | 280/743.1 |
| 5,280,954 | 1/1994 | Henseler et al. | 280/743.1 |
| 5,378,019 | 1/1995 | Smith et al. | 280/743.1 |
| 5,395,134 | 3/1995 | Gunn et al. | 280/743.1 |
| 5,568,938 | 10/1996 | Lindstrom | 280/743.1 |
| 5,685,560 | 11/1997 | Sugiyama et al. | 280/731 |

FOREIGN PATENT DOCUMENTS 405162608  6/1993  Japan .

*Primary Examiner*—Kevin Hurley
*Assistant Examiner*—Michael Britton
*Attorney, Agent, or Firm*—Lonnie R. Drayer

[57] ABSTRACT

An airbag has two cloth layers disposed next to each other and connected with each other in their outer marginal area. One of the cloth layers has an inflation gas inlet opening. The two cloth layers er are connected with each other by at least one tear seam, which at least partially encloses the discharge opening. The tear seam extends away from the discharge opening and is configured so as to tear open when the airbag is inflated by starting at an end of the tear seam that is closest to the inflation gas inlet opening.

11 Claims, 2 Drawing Sheets

AIRBAG WITH TEAR SEAM AND VENTING

FIELD OF THE INVENTION

The invention relates to an airbag for use in protecting a vehicle occupant.

BACKGROUND OF THE INVENTION

It is known to provide discharge openings in airbag modules through which the gas generated by a gas generator can escape from the airbag. This is desirable at the moment the vehicle occupant contacts the airbag. By the fact that the gas can escape through the discharge openings in a calculated way, the vehicle occupant is restrained in a controlled manner.

With such discharge openings it is, however, not desirable that gas can already escape through the discharge openings while the airbag is inflated, as this would require a larger gas generator to produce said additional gas volume. Therefore, various valves and tear seals for such discharge openings had been developed in the past. Such tear seals are, for example, known from U.S. Pat. No. 5,219,179. The discharge openings described therein are sealed by means of a cloth closure featuring a perforation or a tear seam along which the lid tears open thus releasing the discharge opening. With this embodiment it is obtained that the closure sealing the discharge opening tears open only at a specific internal pressure inside the airbag which occurs when the occupant impacts with the airbag. It is, however, a disadvantage of such a sealed discharge opening that a pressure increase inside the airbag, which tears open the lid, can already occur before the impact by the vehicle occupant. For example, vehicle occupant impacts with the airbag can occur when the airbag has already started to be deflated. Furthermore, not only an increased internal pressure in the airbag leads to tearing the lid sealing the discharge opening open, but also an increased force or tension in the airbag material in the circumference of the discharge opening can cause the lid sealing the discharge opening to be torn open. Such forces and tensions can, for example, already occur at the start of inflating the airbag. Altogether it is difficult with discharge openings sealed in this way to exactly set the starting time for discharging the gas from the airbag. This can have the consequence that the impact of the vehicle occupant on the airbag is not sufficiently absorbed or that the airbag is no longer sufficiently filled when the vehicle occupant bumps on the airbag. In both cases undesirable injuries of the vehicle occupant can be the result.

SUMMARY OF THE INVENTION

It is the object of the invention to provide an airbag for an airbag module, wherein the time at which the gas starts to escape from the airbag can be predetermined in a better way. This object is provided with an airbag comprising the features of claim 1.

By the fact that the tear seams connect the two cloth layers which form the airbag, by partially enclosing especially the discharge openings, the unfolding of the airbag can be controlled in a way that it unfolds in the area comprising the discharge openings last. Forces affecting the material of the airbag are thereby kept off the areas comprising the discharge openings until the end of the inflation process. Moreover, the second cloth layer can be held by the tear seams such that the discharge opening is sealed by the second cloth layer. Additional valves or lids for sealing the discharge openings are, therefore, not required.

The tear seams are configured so as to start tearing open at their free ends in the proximity of the gas generator and to continue to tear while the airbag is inflated. This has the effect that the airbag is filled in the area of the inflation gas inlet openings, first up to the area of the discharge openings while the tear seam continuously tears open. By correspondingly selecting the path of the tear seam the course in terms of time of the filling process of the airbag can accurately be controlled. Altogether it is achieved that the opening of the discharge opening in the airbag is controlled by the course of time of the inflation process. In the known airbags, however, the discharge openings were opened exclusively through the internal pressure inside the airbag.

Advantageously the tear seam is produced by sewing the two cloth layers together. This permits an easy production of the tear seams as the two cloth layers of the airbag are in most cases equally connected with each other by sewing. Therefore, seaming the two cloth layers in their marginal area and the production of the tear seams requires only one process step. However, the tear seams can also be produced through any other kind of connecting method allowing a controlled tearing open later. In dependence on the material the tear seams between the two cloth layers of the airbag can also be produced by gluing or welding the cloth layers together.

The discharge opening is advantageously arranged in the proximity of the outer periphery of the airbag. Especially if the inflation gas inlet opening is located in the center of the airbag, a possibly large distance is produced between the inflation gas inlet opening and the discharge opening. It is, therefore, possible to arrange a particularly long tear seam, wherein the period during which the tear seam tears open and thus the time until the discharge opening is released can be varied. This allows the airbag to be configured in a way that the discharge opening is released only at the end of the inflation process of the airbag so as to prevent the gas from escaping prematurely.

This discharge opening is advantageously at least partially enclosed by the tear seam in its peripheral area. Through this particularly close arrangement of the tear seam at the discharge opening it is feasible to exactly protect only the area of the discharge opening against premature force or pressure impacts until the end of the inflation process of the airbag, or to keep the discharge opening sealed until the inflation process is terminated. Said arrangement also permits to provide a possibly long tear seam between the discharge opening and the inflation gas inlet opening with the result that the time until the discharge opening is opened is prolonged.

It is preferred that the tear seam extends substantially in radial direction from the discharge opening towards the inflation gas inlet opening. In case of a plurality of discharge openings arranged at the periphery of the airbag this allows a particularly regular and symmetric unfolding or filling of the airbag. As the tear seams start tearing open in the proximity of the inflation gas inlet opening, the airbag will steadily unfold from the inflation gas inlet opening towards the discharge openings or the periphery of the airbag, respectively, when gas flows in from the source of inflation gas which may be a gas generator, or a container of pressurized gas or a hybrid inflator. The radial arrangement of the tear seams makes it possible, especially with a plurality of discharge openings disposed at the periphery of the airbag, to configure the tear seams for each discharge opening identically, wherein a regular filling process of the airbag is achieved.

Starting out from the discharge opening both ends of the tear seam advantageously extend towards the inflation gas inlet opening in a radial direction. The tear seam, therefore, is substantially U-shaped, wherein the U-opening is directed towards the inflation gas inlet opening. This results in a double configuration of the tear seam at each discharge opening, wherein the unfolding or filling process of the airbag can be adjusted more accurately, for example, it can be slowed down. Moreover, this configuration of the tear seam path enables a steady or symmetric enclosure of the discharge opening entailing a steady introduction of forces in the discharge opening area when the airbag unfolds.

It is moreover preferred that the tear seam encloses the discharge opening at least in an area of 120°. This minimum enclosure of the discharge opening guarantees that an undesired premature force or pressure impact on the discharge opening is prevented. Moreover, this enclosure of the discharge opening holds the cloth position of the airbag located opposite the discharge opening above the discharge opening in a way that it remains sealed so as to prevent the gas from escaping prematurely.

The tear seam advantageously extends at least along a third of the distance between the discharge opening and the inflation gas inlet opening. Said minimum length of the tear seam ensures that the unfolding process of the airbag is sufficiently slow and that the discharge openings are released only by the end of the unfolding or inflation process of the airbag. It is thereby achieved that the airbag shows the required absorbing properties right at the moment of the impact through the vehicle occupant for keeping the risk of injuries for the occupant as small as possible.

The tear seam preferably has a double configuration at least beside or in front of the discharge opening. This configuration of the tear seam permits a further time prolongation until the discharge openings open. Furthermore, such a double configuration of the tear seam provides additional security against the tear seam tearing open prematurely in the discharge opening area, due to pressure impacts or forces at the beginning of the inflation process of the airbag.

It is further preferred that the tear seam has a meandering path. Such a wave-like path of the tear seam, especially between the discharge opening and the inflation gas inlet opening, entails a further prolongation of the time between the start of the inflation process of the airbag and the release of the discharge openings. Moreover, such a configuration of the path of the tear seam also permits to slow down the inflation process or unfolding process of the airbag altogether. Depending on the type of vehicle in which the airbag is installed, this aspect can be necessary for setting the time until the complete inflation of the airbag in a manner that the airbag exactly shows the desired absorbing effects at the impact of the vehicle occupant.

The discharge opening is preferably sealed with an additional closure which opens at a specific internal pressure inside the airbag. Said closure can be any known closure for discharge openings of an airbag in an airbag module. Thus, the closure can, for example, be made from a material with small tearing resistance or it can be provided with a corresponding perforation. The combination of such a closure with the inventive tear seam ensures that the closure is opened only through an increase in pressure once the airbag is fully inflated, as the discharge opening is at first protected by the tear seam and the opposite cloth layer. Moreover, the tear seam keeps forces or tensions transferred via the cloth layer off the discharge opening and especially off the closure sealing said discharge opening. It is thereby guaranteed that forces or tensions, as can occur at the beginning of the inflation process or the unfolding process of the airbag, cannot prematurely tear open the closure of the discharge opening.

BRIEF DESCRIPTION OF THE DRAWINGS

The invention is hereinafter explained in more detail by means of specific embodiment examples with reference to the attached drawings.

DETAILED DESCRIPTION OF THE INVENTION

Figure 1:
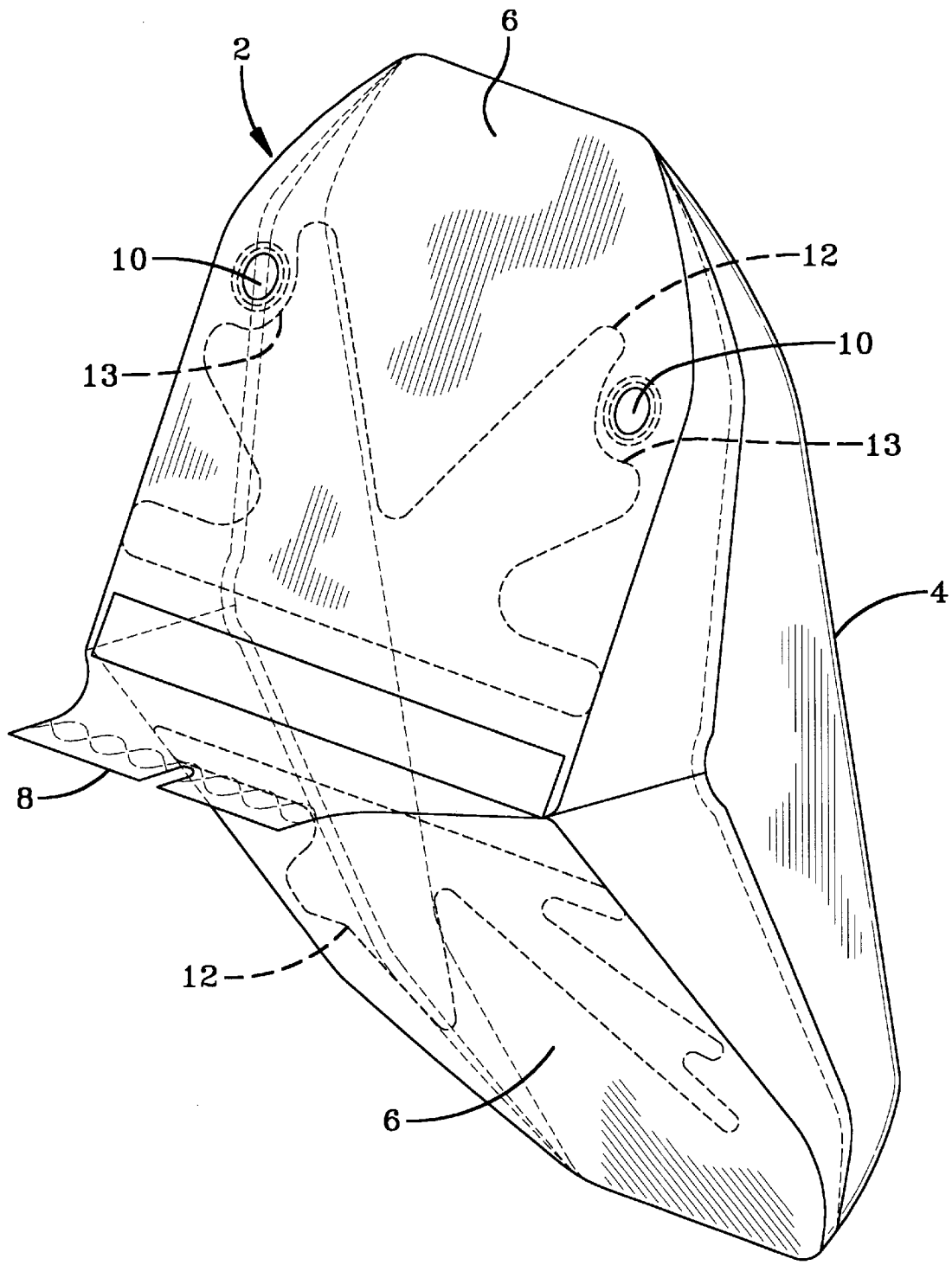
FIG. 1 shows an airbag according to the invention for an airbag module in the unfolded or inflated state.

FIG. 1 shows an inventive airbag 2 in an inflated state. The airbag comprises two cloth layers 4, 6. The upper cloth layer 4 is closed and faces the vehicle occupant. The bottom cloth layer 6 consists of two parts and is disposed at the rear side of the airbag, i.e. at the side of the airbag facing away from the vehicle occupant. The inflation gas inlet opening for mating with a source of inflation gas such as a gas generator is not illustrated in FIG. 1, it is, however, located in the area of attachment 8. In the area of the outer periphery of the airbag 2, as remote as possible from attachment 8 and thus the inflation gas inlet, discharge openings 10 are disposed in the bottom cloth layer 6. Both cloth layers 4 and 6 are next to each other when the airbag 2 is not inflated, and are connected with each other by the tear seams 12, illustrated as a dotted line. The airbag 2 can only be inflated or filled if the tear seams 12 tear open so as to permit the cloth layers 4, 6 to become detached from each other. The tear seams 12 extend on the side of discharge openings 10 facing the center of the airbag 2 in the area of their outer periphery. The tear seam 12 thereby approximately defines a semicircle 13 about the discharge opening 10 and then extends on both sides of the discharge opening 10 in a bent manner in an essentially radial direction towards the central point of cloth layer 6 of airbag 2. While in this embodiment the tear seam is shown as being arcuate in the region of the discharge openings 10, it is understood that the tear seam could follow any appropriate path such as parabolic or elliptical paths. When inflating the airbag 2 the tear seam 12 starts to tear open at its free ends in the area of the central point of the cloth layer 6 in the proximity of the attachment 8 or the gas generator, respectively, for continuously tearing open up to the discharge opening 10. In the area of discharge openings 10 the tear seam 12 thus holds the cloth layer 4 next to cloth layer 6 until the tear seam 12 is completely torn open. The discharge openings 10 thereby remain sealed until the airbag is almost completely inflated, and the gas is prevented from escaping from the airbag 2 prematurely.

Figure 2:
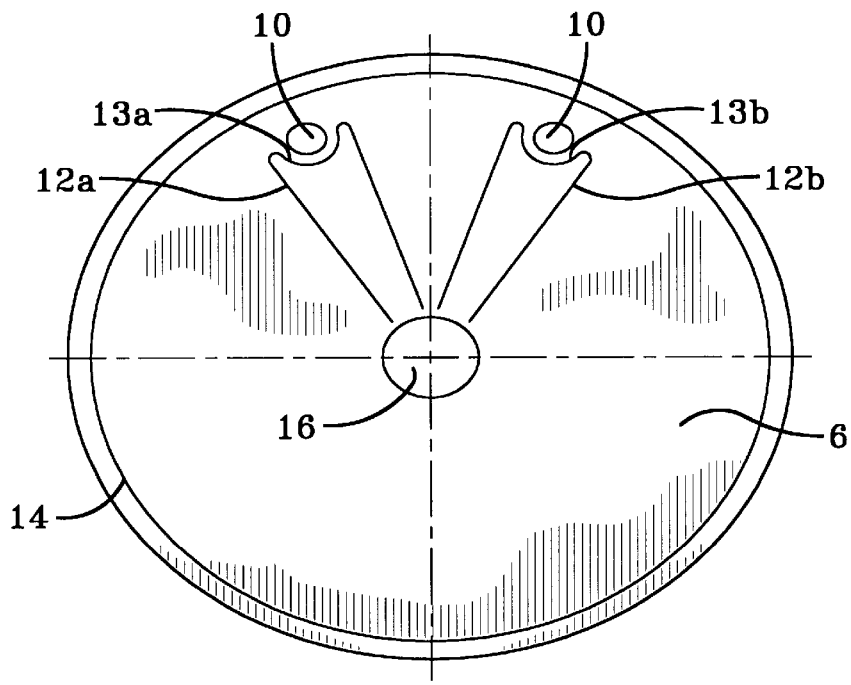
FIG. 2 shows an upper view on an airbag according to the invention.

FIG. 2 shows a schematic upper view on the rear side of the inventive airbag. The airbag 2 comprises two cloth layers 4, 6, wherein the front cloth layer 4 cannot be seen in this view. Both cloth layers are connected with each other in the marginal area of airbag 2 by means of a peripheral seam 14. Cloth layer 6 has an inflation gas inlet opening 16 in its center through which a gas generator or a part of the gas generator, or any other suitable source of inflation gas, can extend into the airbag 2. In the marginal area of airbag 2 discharge openings 10 are arranged in the proximity of the peripheral seam 14. In this schematic illustration only two discharge openings 10 are shown, however, any required number of discharge openings 10 can be arranged at the airbag 2 according to need. Both cloth layers 4, 6 are connected with each other through tear seams 12a, 12b as long as the airbag is not inflated. The tear seams 12a, 12b extend on the side of the discharge openings 10 facing away from peripheral seam 14 in the region of the periphery of the discharge openings 10. The tear seams 12a, 12b thereby partially enclose each of the discharge openings 10 approximately in a semi-circle. At the respective two ends of the semi-circle shaped arcs 13a, 13b the tear seams 12a, 12b extend in a bent manner by approximately 180° towards the inflation gas inlet opening 16. Starting out from the discharge openings 10 the tear seams 12a, 12b thereby extend up to the proximity of the inflation gas inlet opening 16. The paths of the tear seams 12a, 12b can thereby be configured differently. For example, both ends of tear seam 12a extend towards the central point of opening 16 in a radial direction, i.e. both ends of tear seam 12a approach each other. In the case of tear seam 12b, however, both ends run parallel to each other in direction of the opening 16. Both ends of tear seam 12b thereby run parallel to an imaginary line between the central points of the discharge opening 10 and the inflation gas inlet opening 16.

Figure 3:
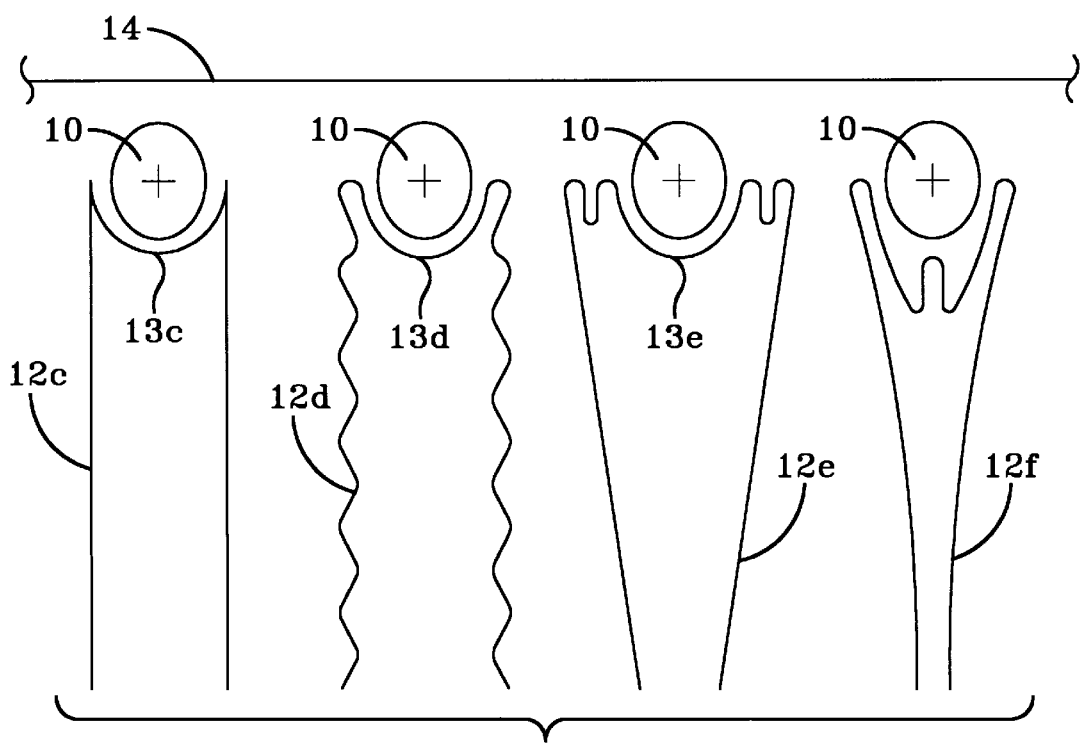
FIG. 3 shows different possible paths of the tear seams.

FIG. 3 shows further possible paths of the tear seams 12 in the inventive airbag. FIG. 3 is a schematic illustration, the peripheral seam 14 of the airbag 2 and the edge of the inflation gas inlet opening 16 for the gas generator are unwound, i.e. illustrated as straight lines. The figure shows four discharge openings 10 with four differently configured tear seams 12c, 12d, 12e, 12f. Tear seam 12c runs in the peripheral area of discharge opening 10 facing away from peripheral seam 14 and is configured as a semi-circle 13c. At the two ends of semi-circle 13c the tear seam 12c returns at an acute angle so that the two ends of tear seam 12c extend parallel to each other towards the inflation gas inlet opening 16.

The tear seam 12d shows another possible path or configuration. Tear seam 12d runs, just like tear seam 12c, in a semi-circle shaped way in the area of discharge opening 10. At the two ends of semi-circle 13d the tear seam 12d runs in a U-shaped bent manner. Starting out from the ends of the semi-circle 13d the ends of the tear seam 12d extend in directions parallel to each other towards the inflation gas inlet opening 16. Both ends of tear seam 12d thereby have a meandering path, i.e. in the form of a wavy line. In contrast to tear seam 12c this form of tear seam 12d prolongs the path to be torn open and thus also the time for the tearing open process. Such a variation of the path of tear seam 12c, 12d permits to more exactly adjust the time for releasing the discharge opening 10 to the desired requirements.

A further possible path or configuration of tear seam 12 is illustrated by tear seam 12e. Tear seam 12e equally runs in the area of discharge opening 10 in a semi-circle manner. At the two ends of semi-circle 13e the tear seam 12e paths are bent in a U-shaped manner, wherein two further U-bends are joined. Following the first U-shaped bend of tear seam 12e an S-shaped path of tear seam 12e towards the peripheral seam 14 of the airbag 2 is obtained. Following this S-shaped path, or double U-shaped path, respectively, both ends of tear seam 12e extend towards the central point of inflation gas inlet opening 16 in a radial direction. The ends of tear seam 12e thus run towards each other in a V-shaped manner. In contrast to the path of tear seam 12d such a configuration of the path of tear seam 12e at first permits the airbag 2 to be torn open and filled faster up to the area of discharge openings 10. In the area of discharge opening 10 the further filling process of the airbag is then slowed down through the U-bends of the path of tear seam 12e. This makes it feasible that airbag 2 is at first inflated to a major part of its size in a fast way whereas the release of the discharge opening 10 is then further delayed through the U-bends of the path of tear seam 12e. Moreover, a better protection of the discharge opening and a possibly disposed seal of the discharge opening 10 can be obtained against prematurely occurring forces or pressure impacts through the four-fold path of tear seam 12e lateral of the discharge opening 10.

The tear seam 12f shows a further possible path or configuration. Starting out from an axis between the central point of the opening 16 and the central point of the discharge opening 10 the tear seam 12f runs in an arc to an area in the proximity of the periphery of the discharge opening 10 by starting in the proximity of inflation gas inlet opening 16. The tear seam 12f thereby runs in an arc-shaped manner to an area lateral of the discharge opening 10, to be looked at in direction towards the axis, between the central point of the inflation gas inlet opening 16 and the central point of discharge opening 10. Approximately at the height of the central axis though the discharge opening 10, parallel to the peripheral seam 14, the tear seam 12f bends in a U-shaped manner and returns parallel up to an area in the proximity of the axis between the central point of inflation gas inlet opening 16 and the central point of discharge opening 10, where the tear seam 12f bends anew and runs in parallel to the axis between the central point of inflation gas inlet opening 16 and the central point of the discharge opening 10 towards the discharge opening 10. In the proximity of the periphery of discharge opening 10 the tear seam 12f makes another bend by approximately 90° and runs perpendicularly towards the imaginary axis between the central point of opening 16 and the central point of the discharge opening 10. At the other side of said axis the tear seam 12f continues to run mirror-symmetrically to the previously described path. The configuration of tear seam 12f causes the airbag 2 to unfold more slowly in the area of discharge opening 10, which allows the discharge opening 10 to open late.

The path or configurations of tear seams 12 described in FIG. 3 are merely examples of possible paths or configurations. According to the desired course of the unfolding process of the airbag and to the desired start of the discharge process through the discharge openings 10, the tear seams 12 can be configured in any desired way. In this respect combinations of the above-described tear seam configurations are possible.

I claim:

1. An airbag comprising two cloth layers disposed next to each other which are connected with each other in their outer marginal area, wherein one cloth layer comprises an inflation gas inlet opening, at least one discharge opening is disposed in at least one of the cloth layers, the two cloth layers disposed next to each other are connected with each other by at least one tear seam, said tear seam partially encloses the discharge opening by extending around at least 120° around the periphery of the discharge opening, the tear seam further extending away from the discharge opening toward the inflation gas inlet opening and being configured so as to tear open when the airbag is inflated by starting to tear at an end of the tear seam closest to the inflation gas inlet opening.

2. The airbag described in claim 1 wherein the tear seam is produced by sewing the two cloth layers together.

3. The airbag described in claim 1 wherein the discharge opening is disposed in the proximity of the outer periphery of the airbag.

4. The airbag described in claim 2 wherein the discharge opening is disposed in the proximity of the outer periphery of the airbag.

5. The airbag described in claim 1 wherein the discharge opening is at least partially enclosed by the tear seam in the region of the peripheral area.

6. The airbag described in claim 1 wherein the tear seam extends from the discharge opening towards the inflation gas inlet opening in an essentially radial direction.

7. The airbag described in claim 1 wherein both ends of the tear seam, starting out from the discharge opening extend towards the inflation gas inlet opening in a substantially radial direction.

8. The airbag described in claim 1 wherein the tear seam extends at least along a third of the distance between the discharge opening and the inflation gas inlet opening.

9. The airbag described in claim 1 wherein the tear seam has an undulating configuration at least beside or in front of the discharge opening.

10. The airbag described in claim 1 wherein the tear seam has a meandering path.

11. The airbag described in claim 1 wherein the discharge opening is sealed with an additional closure, the closure opening at a specific internal pressure in the airbag.

* * * * *